US008521627B2

(12) United States Patent
Ford et al.

(10) Patent No.: US 8,521,627 B2
(45) Date of Patent: Aug. 27, 2013

(54) SYSTEMS AND METHODS FOR FACILITATING ELECTRONIC SECURITIES TRANSACTIONS

(75) Inventors: Preston R. Ford, Marblehead, MA (US); Paul D. Filipski, Natick, MA (US); Christian A. Dubois, Hingham, MA (US); John Mark Enriquez, Harvard, MA (US); Robert J. Russel, Riverside, CT (US); Kevin K. Sorber, Exeter, NH (US)

(73) Assignees: Blockross Holdings, LLC, Boston, MA (US); State Street Global Markets, LLC., Boston, MA (US)

( * ) Notice: Subject to any disclaimer, the term of this patent is extended or adjusted under 35 U.S.C. 154(b) by 1377 days.

(21) Appl. No.: 11/736,962

(22) Filed: Apr. 18, 2007

(65) Prior Publication Data

US 2008/0262957 A1    Oct. 23, 2008

(51) Int. Cl.
*G06Q 40/00* (2012.01)
(52) U.S. Cl.
USPC ............... 705/35; 705/37; 705/26.1; 705/1.1; 705/36 R
(58) Field of Classification Search
USPC ................. 705/1, 35, 37, 1.1, 36 R, 77, 26.1, 705/80; 428/447; 348/211.2
See application file for complete search history.

(56) References Cited

U.S. PATENT DOCUMENTS

| 2,134,118 | A | 12/1930 | Foss |
|---|---|---|---|
| 3,573,747 | A | 4/1971 | Adams et al. |
| 3,581,072 | A | 5/1971 | Nymeyer et al. |
| 4,412,287 | A | 10/1983 | Braddock, III |
| 4,674,044 | A | 6/1987 | Kalmus et al. |
| 4,677,552 | A | 6/1987 | Sibley, Jr. |
| 4,774,663 | A | 9/1988 | Musmanno et al. |
| 4,823,265 | A | 4/1989 | Nelson |
| 4,903,201 | A | 2/1990 | Wagner |

(Continued)

FOREIGN PATENT DOCUMENTS

| EP | 0401203 A2 | 12/1990 |
|---|---|---|
| JP | 2004-287893 A | 10/2004 |

(Continued)

OTHER PUBLICATIONS

TRADERSmagazine.com "Merrin's Solution to Liquidity Problem: A Better Mousetrap to Crush Market Impact?"—By: Peter Chapman; Sep. 2000.*

(Continued)

*Primary Examiner* — John H Holly
(74) *Attorney, Agent, or Firm* — Foley and Lardner LLP; John D. Lanza

(57) ABSTRACT

A method for facilitating securities transactions is shown. In one embodiment, the method includes identifying, by a computer system from an OMS comprising a plurality of stored security orders, a subset of orders specifying at least a minimum available quantity; transmitting, by the computer system to an ETM, a non-binding indication corresponding to one order of the subset of orders, the non-binding indication comprising a security identifier and the order type; receiving, by the computer system, an indication that a match exists to the non-binding indication; determining, by the computer system, a total available quantity for the order corresponding to the non-binding indication; and transmitting, by the OMS, a binding order corresponding to the non-binding indication, the binding order comprising the determined total available quantity. Corresponding systems are also described.

19 Claims, 8 Drawing Sheets

(56) References Cited

U.S. PATENT DOCUMENTS

| | | | |
|---|---|---|---|
| 5,077,665 A | 12/1991 | Silverman et al. |
| 5,101,353 A | 3/1992 | Lupien et al. |
| 5,126,936 A | 6/1992 | Champion et al. |
| 5,136,501 A | 8/1992 | Silverman et al. |
| 5,148,365 A | 9/1992 | Dembo |
| 5,168,446 A | 12/1992 | Wiseman |
| 5,297,031 A | 3/1994 | Gutterman et al. |
| 5,305,200 A | 4/1994 | Hartheimer et al. |
| 5,375,055 A | 12/1994 | Togher et al. |
| 5,497,317 A | 3/1996 | Hawkins et al. |
| 5,517,406 A | 5/1996 | Harris et al. |
| 5,544,355 A | 8/1996 | Chaudhuri et al. |
| 5,592,375 A | 1/1997 | Salmon et al. |
| 5,615,269 A | 3/1997 | Micali |
| 5,664,115 A | 9/1997 | Fraser |
| 5,689,652 A | 11/1997 | Lupien et al. |
| 5,710,889 A | 1/1998 | Clark et al. |
| 5,715,402 A | 2/1998 | Popolo et al. |
| 5,717,989 A | 2/1998 | Tozzoli et al. |
| 5,727,165 A | 3/1998 | Ordish et al. |
| 5,787,402 A | 7/1998 | Potter et al. |
| 5,794,207 A | 8/1998 | Walker et al. |
| 5,794,219 A | 8/1998 | Brown et al. |
| 5,809,483 A | 9/1998 | Broka et al. |
| 5,818,914 A | 10/1998 | Fujisaki |
| 5,835,087 A | 11/1998 | Herz et al. |
| 5,842,178 A | 11/1998 | Giovannoli |
| 5,845,266 A | 12/1998 | Lupien et al. |
| 5,873,071 A | 2/1999 | Ferstenberg et al. |
| 5,897,620 A | 4/1999 | Walker et al. |
| 5,924,082 A | 7/1999 | Silverman et al. |
| 5,924,083 A | 7/1999 | Silverman et al. |
| 5,926,801 A | 7/1999 | Matsubara et al. |
| 5,950,176 A | 9/1999 | Keiser et al. |
| 5,950,177 A | 9/1999 | Lupien et al. |
| 6,012,046 A | 1/2000 | Lupien et al. |
| 6,014,627 A | 1/2000 | Togher et al. |
| 6,029,146 A | 2/2000 | Hawkins et al. |
| 6,029,195 A | 2/2000 | Herz |
| 6,055,504 A | 4/2000 | Chou et al. |
| 6,058,379 A | 5/2000 | Odom et al. |
| 6,112,189 A | 8/2000 | Rickard et al. |
| 6,131,087 A | 10/2000 | Luke et al. |
| 6,134,535 A | 10/2000 | Belzberg |
| 6,141,653 A | 10/2000 | Conklin et al. |
| 6,157,918 A | 12/2000 | Shepherd |
| 6,195,647 B1 | 2/2001 | Martyn et al. |
| 6,247,000 B1 | 6/2001 | Hawkins et al. |
| 6,266,652 B1 | 7/2001 | Godin et al. |
| 6,278,982 B1 | 8/2001 | Korhammer et al. |
| 6,313,833 B1 | 11/2001 | Knight |
| 6,349,291 B1 | 2/2002 | Varma |
| 6,401,080 B1 | 6/2002 | Bigus et al. |
| 6,408,282 B1 | 6/2002 | Buist |
| 6,418,419 B1 | 7/2002 | Nieboer et al. |
| 6,421,653 B1 | 7/2002 | May |
| 6,493,683 B1 | 12/2002 | David et al. |
| 6,505,174 B1 | 1/2003 | Keiser et al. |
| 6,505,175 B1 | 1/2003 | Silverman et al. |
| H2064 H | 5/2003 | Buchalter |
| 6,564,191 B1 | 5/2003 | Reddy |
| 6,704,716 B1 | 3/2004 | Force |
| 6,747,692 B2 | 6/2004 | Patel et al. |
| 6,968,318 B1 | 11/2005 | Ferstenberg et al. |
| 7,035,819 B1 | 4/2006 | Gianakouros et al. |
| 7,136,834 B1 * | 11/2006 | Merrin et al. ............ 705/37 |
| 7,149,713 B2 | 12/2006 | Bove et al. |
| 7,747,515 B1 | 6/2010 | Merrin et al. |
| 7,831,507 B2 | 11/2010 | Merrin et al. |
| 2001/0037284 A1 | 11/2001 | Finkelstein et al. |
| 2001/0047323 A1 | 11/2001 | Schmidt |
| 2002/0007335 A1 | 1/2002 | Millard et al. |
| 2002/0010672 A1 * | 1/2002 | Waelbroeck et al. ...... 705/37 |
| 2002/0032632 A1 | 3/2002 | Sernet |
| 2002/0035533 A1 | 3/2002 | Mache et al. |
| 2002/0052824 A1 | 5/2002 | Mahanti et al. |
| 2002/0055901 A1 | 5/2002 | Gianakouros et al. |
| 2002/0099646 A1 | 7/2002 | Agarwal et al. |
| 2002/0099647 A1 | 7/2002 | Howorka et al. |
| 2002/0103732 A1 | 8/2002 | Bundy et al. |
| 2002/0128955 A1 | 9/2002 | Brady et al. |
| 2002/0138383 A1 | 9/2002 | Rhee |
| 2002/0174045 A1 | 11/2002 | Arena et al. |
| 2003/0004859 A1 | 1/2003 | Shaw et al. |
| 2003/0014354 A1 | 1/2003 | Madoff et al. |
| 2003/0050888 A1 | 3/2003 | Satow et al. |
| 2003/0061069 A1 | 3/2003 | Silverman et al. |
| 2003/0093362 A1 | 5/2003 | Tupper et al. |
| 2003/0216932 A1 | 11/2003 | Foley |
| 2003/0220868 A1 | 11/2003 | May |
| 2003/0229563 A1 | 12/2003 | Moore et al. |
| 2003/0229566 A1 | 12/2003 | Moore et al. |
| 2004/0034591 A1 | 2/2004 | Waelbroeck et al. |
| 2004/0172356 A1 | 9/2004 | Agarwal et al. |
| 2004/0199453 A1 | 10/2004 | Brady et al. |
| 2005/0108140 A1 | 5/2005 | Motte et al. |
| 2005/0114254 A1 | 5/2005 | Condie |
| 2005/0197857 A1 | 9/2005 | Avery |
| 2005/0234805 A1 | 10/2005 | Robertson et al. |
| 2006/0015446 A1 | 1/2006 | Burkhardt et al. |
| 2006/0026090 A1 | 2/2006 | Balabon |
| 2006/0031153 A1 | 2/2006 | Kim |
| 2006/0059082 A1 | 3/2006 | Silverman et al. |
| 2006/0080220 A1 | 4/2006 | Samuel et al. |
| 2006/0085317 A1 | 4/2006 | Allen |
| 2006/0089899 A1 | 4/2006 | Durkin et al. |

FOREIGN PATENT DOCUMENTS

| | | |
|---|---|---|
| WO | WO 95/06918 A2 | 3/1995 |
| WO | WO 96/34357 A1 | 10/1996 |
| WO | WO 00/70518 A2 | 11/2000 |
| WO | WO 01/25996 A1 | 4/2001 |

OTHER PUBLICATIONS

*Investment Technology Group, Inc. et al.* v. *Liquidnet Holdings Inc.; Liquidnet Holdings Inc.* v. *Pulse Trading, Inc.*; Southern District of New York; Case 1:07-cv-00510-SAS-HBP; Opinion & Order 07 Civ.510 (SAS) 07 Civ.6886 (SAS); dated Jan. 19, 2010.

*Investment Technology Group Inc. et al.* v. *Liquidnet Holdings, Inc.*; Southern District of New York, Civil Action No. 07 CIV 510 (GEL/HP); Reply to Amended Counterclaims Made in Response to Amended Complaint; dated Mar. 31, 2008.

*Investment Technology Group Inc. et al.* v. *Liquidnet Holdings, Inc.*; Southern District of New York, Civil Action No. 1:07-cv-00510-GEL; Liquidnet's Open Claim construction Brief, with Exhibits; dated Mar. 20, 2009.

*Investment Technology Group Inc. et al.* v. *Liquidnet Holdings, Inc.*; Southern District of New York, Civil Action No. 07 CIV 510 (GEL/HP); Liquidnet's Reply claim Construction Brief, with Exhibits; dated Apr. 17, 2009.

*Investment Technology Group Inc. et al.* v. *Liquidnet Holdings, Inc.*; Southern District of New York, Civil Action No. 1:07-cv-00510-GEL; Opening Brief of Investment Technology Group Inc. et al. and Pulse Trading, Inc. Concerning Claim Construction, and Exhibits, dated Mar. 20, 2009.

*Investment Technology Group Inc. et al.* v. *Liquidnet Holdings, Inc.*; Southern District of New York, Civil Action No. 1:07-cv-00510-GEL; Response Brief in Investment Technology Group, Inc. et al. and Pulse Trading, Inc. Concerning Claim Construction, dated Apr. 17, 2009.

E-mail string containing and e-mail dated Jun. 19, 1998 from Eric Legoff to James Nikolai transmitting the Proposal to Jeffries & Company, Inc.

VIE Systems, Inc.: "Proposal to Jeffries & Company, Inc.," Jun. 19, 1998, pp. 1-16.

K. Lupowitz: "Merrin (DOS)/Harborside Installation Guide," Jul. 28, 1998, 7 pages.

T. Tarrant: "@Harborside Links Demonstrate New Paradigm as Leading Order Management and Network Vendors Connect," Jul. 12, 1999, 3 pages.

Microsoft Press Computer Dictionary, Third Edition, 1997, p. 456.
J. Davis: "Big Storm Rising," Business 2.0, Sep. 1, 1998, 2 pages.
A. Svaidi: "Wall Street Turns to Durango for Help," Denver Business Journal, Jan. 30, 1998, 3 pages.
Victor Kulkosky, "Making Connections in Off-Exchange Trading," Wall Street & Technology, New York, Oct. 1993, vol. 11, Iss. 5, p. 14, 4 pgs.
Peter Chapman, "Merrin's Solution to Liquidity Problems," Traders Magazine, Oct. 2000, vol. 13, Iss. 173, p. 54, 3 pgs.
Mary Schroeder, "Liquidnet to Build Interfaces With Four OMS's," Securities Industry News, Nov. 2000, vol. 12, Iss. 43, p. 5, 1 pg.
Anthony Guerra, "Will Liquidnet Catch the Buy Side," Wall Street & Technology, Jul. 2001, 19, 7, p. 75, 3 pgs.
European Office Action in connection with European Patent Appln. 98921236.0 dated Dec. 14, 2007.
Japanese Office Action in connection with Japanese Appln. 10/549604 dated May 13, 2008.
*Investment Technology Group Inc. et al.* v. *Liquidnet Holdings, Inc.*; Southern District of New York, Civil Action No. 1:07-cv-00510-GEL; Notice of Motion for Leave to File Amended Complaint, Exhibits attached; dated Jan. 10, 2008.
*Investment Technology Group Inc. et al.* v. *Liquidnet Holdings, Inc.*; Southern District of New York, Civil Action No. 07 CIV 510 (GEL/HP); Liquidnet's Memorandum of Law in Opposition to the Declaratory Judgment Plaintiffs Motion for Leave to Amend Their Complaint; dated Jan. 25, 2007.
Kansas, D., "OptiMark Technologies to Announce Trading System Aimed at Institutions," Wall Street Journal, Sep. 24, 1996.
Letter to Attorney Simon at Foley & Lardner from the SEC, Nov. 30, 1994 regarding Chicago Match with enclosure The Chicago Match Functional Specification Input via Extensive Text File.
Platform 2.0 Software Installation Guide Dated Jan. 22, 1998.
*Investment Technology Group Inc. et al.* v. *Liquidnet Holdings, Inc.*; Southern District of New York, Civil Action No. 07 CIV 510(GEL/HP); Amended Complaint; dated Feb. 14, 2008.
Corcella, K., "Symphony Plays a Solo," Wall Street and Technology, Mar. 1995, vol. 12, No. 11, pp. 22-23.
*Investment Technology Group Inc. et al.* v. *Liquidnet Holdings, Inc.*; Southern District of New York, Civil Action No. 07 CIV 510 (GEL/HP); Declaration of Michael A. Nicodema in Support of Liquidnet's Memorandum of Law in Opposition to the Declaratory Judgment Plaintiffs' Motion for Leave to Amend Their Complaint; Exhibits attached; dated Jan. 25, 2008.
*Investment Technology Group Inc. et al.* v. *Liquidnet Holdings, Inc.*; Southern District of New York, Civil Action No. 07 CIV 510 (GEL/HP); Liquidnet Holdings, Inc.'s Answer to the Amended Complaint, Counterclaims and Affirmative Defenses, dated Feb. 29, 2008.

"India: No route in 3-day segment for negotiated deals: NSE." Businessline. Chennai: Sep. 5, 1999. p. 1 (2 pages).
Anonymous. "IBEX system links buyers to global business community." Purchasing. Boston: Oct. 5, 1995. vol. 119, Iss. 5; p. 23, 4 pgs.
*Investment Technology Group Inc. et al.* v. *Liquidnet Holdings, Inc.*; Southern District of New York, Civil Action No. 07 CIV 510 (GEL/HP); Liquidnet Holdings, Inc.'s Amended Answer to the Amended Complaint, Counterclaims and Affirmative Defenses, dated Mar. 14, 2008.
*Investment Technology Group Inc. et al.* v. *Liquidnet Holdings, Inc.*; Southern District of New York, Civil Action No. 1:07-cv-00510-GEL; Plaintiffs' Reply Memorandum of Law in Further Support of its Motion for Leave to Amend its Complaint to Add Additional Allegations to Existing Claims and to Add a Claim for Tortious Interference; dated Feb. 6, 2008.
Chapman, Peter; "The Relaunch of Harborside: Going Toe to Toe with Liquidnet"; TRADERSmagazine.com; http://www.tradersmagazine.com/issues/20011231/1117-1.html?type=printer_friendly; Sep. 2000, printed Jan. 14, 2008.
Oppenheim, E., "Electronic Trading Systems: Which, Why, Where," G-183. Business Co., Inc. Report, pp. 134-136.
Jeffries Launches @Harborside, May 11, 1999. Press Release. www.jefco.com.
*Investment Technology Group* vs. *:Liquidnet Holdings, Inc.* ; *Liquidnet Holdings, Inc.* vs. *Pulse Trading, Inc*,; Southern District of New York; Case 1:07-cv-06886-SAS, Document 70; Opinion & Order 07 Civ. 510 (SAS) 07 Civ. 6886 (SAS); filed Dec. 21, 2010.
Chapman, Peter; "Merrins Solution to Liquidity Problem: A Better Mousetrap to Crush Market Impact?", Sep. 2000; TRADERSMagazine.com; http//tradersmagazine.com/issues/2000093/23-1.
International Preliminary Report on Patentability for PCT/US2008/060714 dated Nov. 3, 2008.
International Search Report for PCT/US2008/060714 dated Nov. 3, 2008.
*Investment Technology Group Inc. et al.* v. *Liquidnet Holdings, Inc.*; Southern District of New York, Civil Action No. 1:07-cv-06886-SAS; Summary Judgment Order; dated Dec. 21, 2010.
US Notice of Allowance on U.S. Appl. No. 12/050,863 dated Oct. 11, 2011.
US Notice of Allowance on U.S. Appl. No. 12/050,863 dated Jun. 17, 2011.
US Office Action on U.S. Appl. No. 12/050,863 dated Sep. 9, 2010.
Written Opinion of the International Search Authority for PCT/US2008/060714 dated Nov. 3, 2008.

* cited by examiner

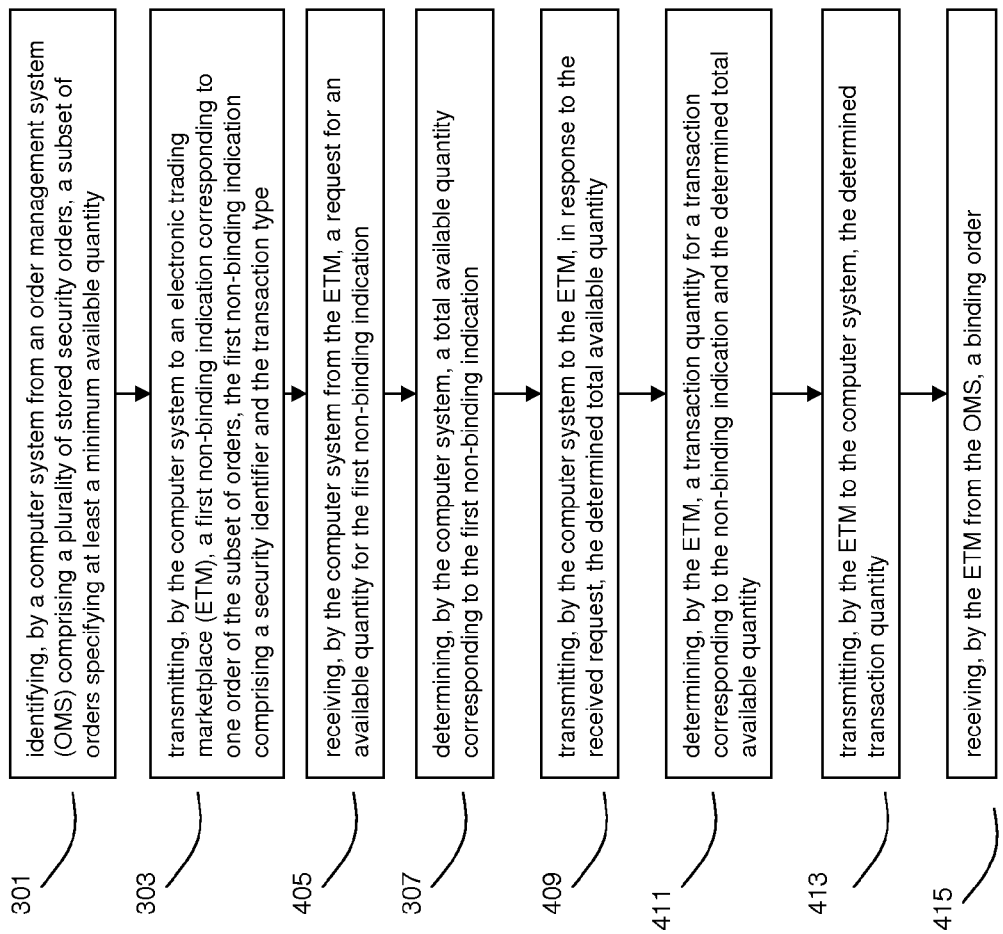

SYSTEMS AND METHODS FOR FACILITATING ELECTRONIC SECURITIES TRANSACTIONS

FIELD OF THE INVENTION

The present invention relates to electronic securities transactions, and more specifically to using an electronic trading market to match orders received by a number of order input systems.

BACKGROUND OF THE INVENTION

Computers are often used to facilitate trading of securities. Many financial institutions record their orders to purchase or sell securities in computerized order management systems (OMSs). The orders in the OMS may then either be manually or electronically transmitted to other sources for finding potential matches and executing transactions, such as registered broker-dealers, electronic trading marketplaces (ETMs), or to other financial institutions or market intermediaries.

One problem which may arise in securities trading is that traders may not be able to execute large-volume trades without unduly affecting the market price of the traded security. For example, an institutional trader may wish to alter the contents of their investment portfolios in response to market conditions by selling a large amount of a given stock. Locating one or more parties to trade a large amount of securities with may not be possible without excessive publicity being drawn to the sale, which may cause the market price to drop. Further, if a number of people become aware of the large transaction before it is executed, it may induce speculation by the number of people and they may try to sell their own shares of the stock prior to the handling of the large transaction, further resulting in a price drop.

Existing strategies for offsetting this problem include spreading out trade orders for a large quantity of a security into small orders, sometimes over several trading days, and spreading the orders among several different electronic markets. These strategies may require more effort and overhead costs on the part of a trader, as well as limiting the possible matches that can be found for a given order. For example, if a trader breaks up an order to purchase 300,000 shares of a given stock into 10 smaller orders for 30,000 shares, the trader may not be able to successfully trade with a seller looking to sell at least 200,000 shares. Further, these smaller orders are usually placed into electronic marketplaces with price limits to prevent trading if the marketplace fluctuates unfavorably. Such limit orders demand the attention of the trader regardless of whether a seller is found.

Therefore, there is a need in the art for an electronic trading marketplace that does minimizes intervention required from traders or other parties, and features the benefits of anonymity and the capability to move large amounts of securities. Specifically, a need exists for an ETM that facilitates the confidential and anonymous discovery of a qualified counterparty for an order. Within such a system, a need may also exist for a trader to confidentially determine the trade quantity given his or her assessment of the market at that time.

SUMMARY OF THE INVENTION

The present invention relates to systems and methods for facilitating electronic securities transactions. In some embodiments, the present invention may be used to allow large securities transactions to be executed confidentially, and with a minimum of information leakage to other parties in the marketplace. In other embodiments, the present invention may be used to collect securities orders from a large number of sources to search for potential transactions, and provide means for efficiently executing the transactions. In still other embodiments, the present invention may be used to allow a trader to determine a quantity of a potential transaction to be executed before the trader is required to divulge sensitive information about the amount of the transaction sought or the identity of the trader seeking the transaction.

In one aspect the present invention is a method for facilitating securities transactions. In one embodiment, the method comprises: identifying, by a computer system from an order management system (OMS) comprising a plurality of stored security orders, a subset of orders specifying at least a minimum available quantity; transmitting, by the computer system to an electronic trading marketplace (ETM), a non-binding indication corresponding to one order of the subset of orders, the non-binding indication comprising a security identifier and the order type; receiving, by the computer system, an indication that a match exists to the non-binding indication; determining, by the computer system, a total available quantity for the order corresponding to the non-binding indication; and causing the OMS to transmit a binding order corresponding to the non-binding indication, the binding order comprising the determined total available quantity. In another embodiment, the binding order may comprise a quantity between the total available quantity and the minimum available quantity.

In a second aspect, the present invention is a computer-implemented system for facilitating securities transactions. In one embodiment the system comprises an order information collector which identifies, from at least one order management system (OMS) comprising a plurality of stored security orders, a subset of orders specifying at least a minimum available quantity; and determines a total available quantity for an order corresponding to a non-binding indication; and an electronic trading marketplace (ETM) interface in communication with the order information collector which transmits, to an ETM, a non-binding indication corresponding to one order of the subset of orders, the non-binding indication comprising a security identifier and the order type; and receives an indication that a match exists to the non-binding indication; and transmits, to an OMS, and indication to generate a binding order corresponding to the non-binding indication, the binding order comprising the determined total available quantity.

In a third aspect, the present invention relates to a second computer implemented method for facilitating securities transactions. In one embodiment, the second method comprises: identifying, by a computer system from an order management system (OMS) comprising a plurality of stored security orders, a subset of orders specifying at least a minimum available quantity; transmitting, by the computer system to an electronic trading marketplace (ETM), a first non-binding indication corresponding to one order of the subset of orders, the first non-binding indication comprising a security identifier and the order type; receiving, by the computer system from an ETM, a request for a total available quantity corresponding to the first non-binding indication; determining, by the computer system, a total available quantity corresponding to the first non-binding indication; and transmitting, by the computer system to the ETM, in response to the received request, the determined total available quantity; determining, by the ETM, a transaction quantity for a transaction corresponding to the transmitted request, the first non-binding indication, and the determined total available quantity and transmitting, by the ETM to the computer system, in response to the received total available quantity, the determined transaction quantity.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 4B is a flow diagram of a second embodiment of a computer implemented method for facilitating securities transactions.

DETAILED DESCRIPTION OF THE INVENTION

Figure 1A:
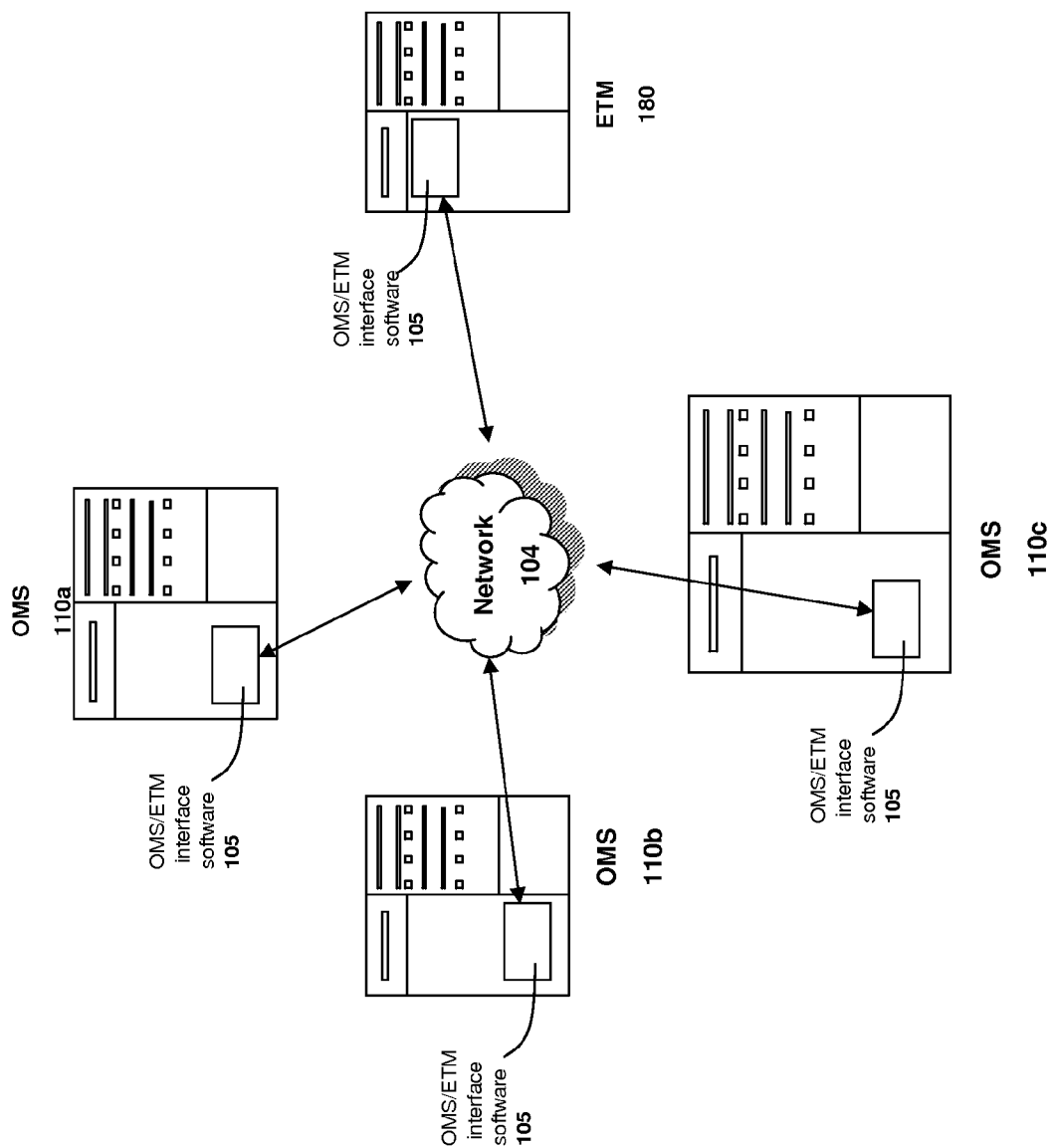
FIG. 1A is a block diagram of one embodiment of a system for facilitating securities transactions.

Referring now to FIG. 1A, one embodiment of a system for facilitating securities transactions is shown. In brief overview, a number of order management systems (OMS) 110*a*, 110*b*, 110*c* (generally 110) are connected via a network 104 to an electronic trading marketplace (ETM) 180. The OMSes 110 and the ETM 180 each comprise OMS/ETM interface software 105 which transmits information about orders and potential trades between the OMSes and the ETM. The ETM identifies potential trades to be executed based on matching two or more received orders or indications of interest. Upon identifying a potential trade, the ETM notifies the corresponding OMSes, and the OMSes may provide further information to the ETM, including providing additional information relating to a quantity of the potential trade to be executed, and a binding order relating to the potential trade. An OMS or ETM may also present an interface to a user station 195 which allows a trader to confirm trades to be executed and also input or select quantities for trades to be executed.

Still referring to FIG. 1A, now in greater detail, one embodiment of a system for facilitating securities transactions is shown. As used herein "security" may mean any financial instrument, including without limitation any note, stock, treasury stock, bond, debenture, certificate of interest or participation in any profit-sharing agreement or in any oil, gas, or other mineral royalty or lease, any collateral trust certificate, preorganization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security'; or any certificate of interest or participation in, temporary or interim certificate for, receipt for, or warrant or right to subscribe to or purchase, any of the foregoing.

OMSes may be operated by securities trading firms, investment management entities, or other entities that manage securities transactions for themselves or on behalf of others. An OMS 110 may comprise any computerized system for storing securities orders. In one embodiment, an OMS comprises a database which stores currently outstanding orders and software which periodically updates the database by adding, removing, or modifying orders. An OMS may comprise one or more inputs to receive orders for securities. These orders may be manually entered, such as by an operator sitting at a terminal, or may be received electronically from other sources, including without limitation other OMSes and users connected to an OMS via a network. An OMS may be maintained by an investment management firm for use by its trading desk, and may collect orders from portfolio managers created during the process of restructuring clients' investment portfolios. In another example, an OMS may be maintained by a brokerage firm, and may collect orders both by individual brokers manually entering orders into desktop computers and by electronically receiving orders from clients and/or brokers working remotely. In this example, the brokerage firm may also have agreements by which the OMS also receives orders placed in at least one other OMS operated by another entity, such as a smaller brokerage firm with which the brokerage firm is partnered.

In the embodiment shown, the OMSes 110 are connected via a network 104 to an ETM 180. The network 104 can be a local-area network (LAN), such as a company Intranet, a metropolitan area network (MAN), or a wide area network (WAN), such as the Internet or the World Wide Web. The network 104 can be a private or public network. In one embodiment, a network 104 may be a combination of private networks and public networks. For example, an OMS may comprise a number of computers linked by a private network, and may be connected via the Internet to the ETM 180.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. Connections and networks included in the connections may comprise the Internet, local networks, web servers, file servers, routers, databases, computers, servers, network appliances, or any other computing devices capable of sending and receiving information. The network may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEEE 802.11b, IEEE 802.11g and direct asynchronous connections, or any combination thereof. The network may comprise mobile telephone networks utilizing any protocol or protocols used to communicate among mobile devices, including AMPS, TDMA, CDMA, GSM, GPRS or UMTS. In some embodiments, some or all of the communications described herein may comprise the Financial Information eXchange (FIX) protocol.

An ETM may comprise any device which receives orders and performs matching functions to determine potential trades. For example, an ETM may receive orders from a number of OMSes and search for orders indicating contra interests in a like security (e.g. search for a buy and sell order for a given stock). An ETM may comprise any other functionality related to securities trading. For example, an ETM may receive market data, such as publicly listed securities prices and past trading activities. An ETM may also comprise secure authentication software to authenticate one or more OMSes or one or more OMS users.

An OMS may also communicate with one or more user stations 195 with user interface software 199. A user station may comprise any computing device 100, and may be connected to the OMS via any means. User stations 195 may be operated by any person involved in the trading of securities. In one embodiment, this software 199 may be used by traders to confirm certain trades before they are executed by the ETM. In another embodiment, this software may also be used by traders to enter quantities, expiration times, limit prices, or any other information corresponding to a given order or nonbinding indication. For example, a trader may specify a number of orders from the OMS to be sent to the ETM as nonbinding indications.

An OMS may also communicate directly with an ETM 180. In one embodiment, binding orders or non-binding indications may be sent directly from an OMS to an ETM using the Financial Information eXchange (FIX) protocol.

In other embodiments, an ETM may communicate directly with one or more user stations 195.

In the embodiment shown, the OMSes 110 and ETM 180 each have OMS/ETM interface software 105 which transmits information about orders and potential trades between the OMSes and the ETM. In some embodiments, the OMS/ETM interface software 105 (also referred to as interface software 105) may be distributed among a number of machines. For example, different components of the interface software 105 may reside on the OMSes 110 and the ETM 180. Although throughout this description the OMS/ETM interface software 105 will be referred to as software, any of the functions performed by the OMS/ETM interface software 105 may also be performed by hardware, or a combination of hardware and software. The interface software may transmit non-binding indications of interest in a particular security from an OMS 110 to an ETM 180. In other embodiments, the interface software 105 may transmit binding orders between the OMS and ETM.

The OMS/ETM interface software 105 may comprise an order collector which periodically identifies outstanding orders in an OMS. The order collector may identify outstanding orders using any method. In some embodiments, the order collector may periodically query a database of stored orders. For example, the order collector may query the OMS for any orders exceeding a given quantity. Or for example, the order collector may query the OMS for orders posted within a given time period. Or for example, the order collector may query the OMS for orders which have been recently modified. In some embodiments, an OMS may specify which orders are made available to the OMS/ETM interface software. For example, a brokerage firm may specify that certain orders should be filled in-house, and designate that they not be made available to the OMS/ETM interface software.

In some embodiments, the order collector may only collect orders for traders or companies who are currently logged into the OMS/ETM interface software. For example, in some embodiments, a trader is required to authorize trades to be executed via the OMS/ETM system, and thus traders may be required to log in before orders the trader is responsible for are collected by the OMS/ETM interface software for transmission to the ETM. In other embodiments, the order collector may only collect orders for traders who are currently logged in to one or more user stations 195.

The OMSes 110*a*, 110*b*, 110*c* may each be operated by separate entities. In one embodiment, an ETM 180 may be operated by an entity other than an entity operating any of the connected OMSes 110. For example, the OMSes may be operated by individual investment companies, while the ETM may be operated by a company specializing in facilitating securities transactions. In another embodiment, one or more of the entities operating the OMSes 110 may also operate a connected ETM. In one embodiment, the OMS/ETM interface software 105 may be distributed by the entity operating the ETM. In some embodiments, the OMS/ETM interface software 105 may be customized for one or more OMSes 110. For example, the database protocols of OMS 110*a* may differ from the database protocols of OMS 110*b*, and the OMS/ETM interface software may be modified such that it can poll the databases of both OMSes. In some embodiments, one or both of an OMS or ETM may provide an API for accessing functionality of the OMS or ETM. For example, a vendor of an ETM may distribute (either publicly or privately) an API which provides an interface for accessing trading and matching functionality. A vendor of an OMS may then create a program which allows the OMS to interface with the ETM using the publish API.

Figure 1B:
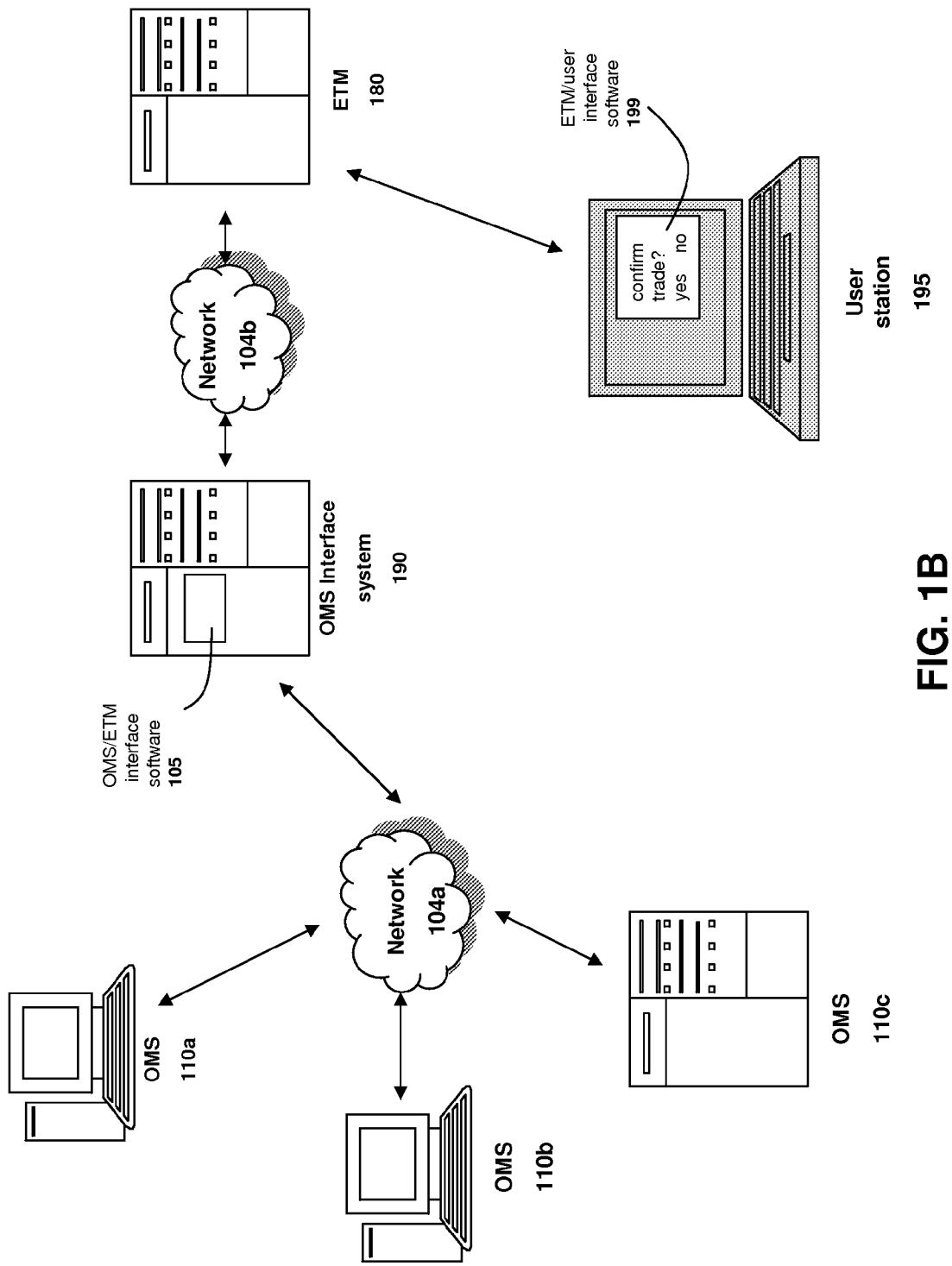
FIG. 1B is a block diagram of a second embodiment of a system for facilitating securities transactions.

Referring now to FIG. 1B, a second embodiment of a system for facilitating securities transactions is shown. In brief overview, a number of OMSes 110*a*, 110*b*, 110*c* are connected via a network 104*a* to an OMS interface system 190 which comprises OMS/ETM interface software 105. The OMS interface system 190 is in turn connected to an ETM 180 via a network 104*b*. The system shown may facilitate transactions in a substantially similar manner to the system depicted in FIG. 1A. The OMS interface system 190 may receive information about orders and potential trades from the OMSes and transmit the information to an ETM 180. The OMS interface system 190 may then receive information from the ETM about potential trades, and relay the information to the appropriate OMSes.

Still referring to FIG. 1B, now in greater detail, OMS/ETM interface software 105 is located on a computer system 190. The OMS interface system 190 may comprise one or more of any of the computing devices described herein. In some embodiments, a single OMS interface system 190 may receive and transmit information to a plurality of OMSes. In other embodiments, a plurality of OMS interface systems 190 may be used to connect a plurality of OMSes to an ETM. For example, an OMS interface system 190 comprising a network appliance may be installed at each of a number of financial institutions operating OMSes.

Although the preceding figures depict OMSs and ETMs, in other embodiments, any other computer systems related to the input, matching, and execution of financial transactions may be used in combination with or in place of an OMS or ETM, including without limitation execution management systems (EMSs). For example, a user may interact with an EMS to manage orders across a number of ETMs. In this example, a user may log into an EMS, and the EMS may comprise some or all of the OMS/ETM interface functionality described. For example, a user station 195 may communicate with or execute one or more EMSs, which may in turn communicate with an OMS and/or ETM. Throughout this description and in the claims, "order management system" and "OMS" may refer to either an OMS or any combination of an OMS and an EMS.

Figure 1C:
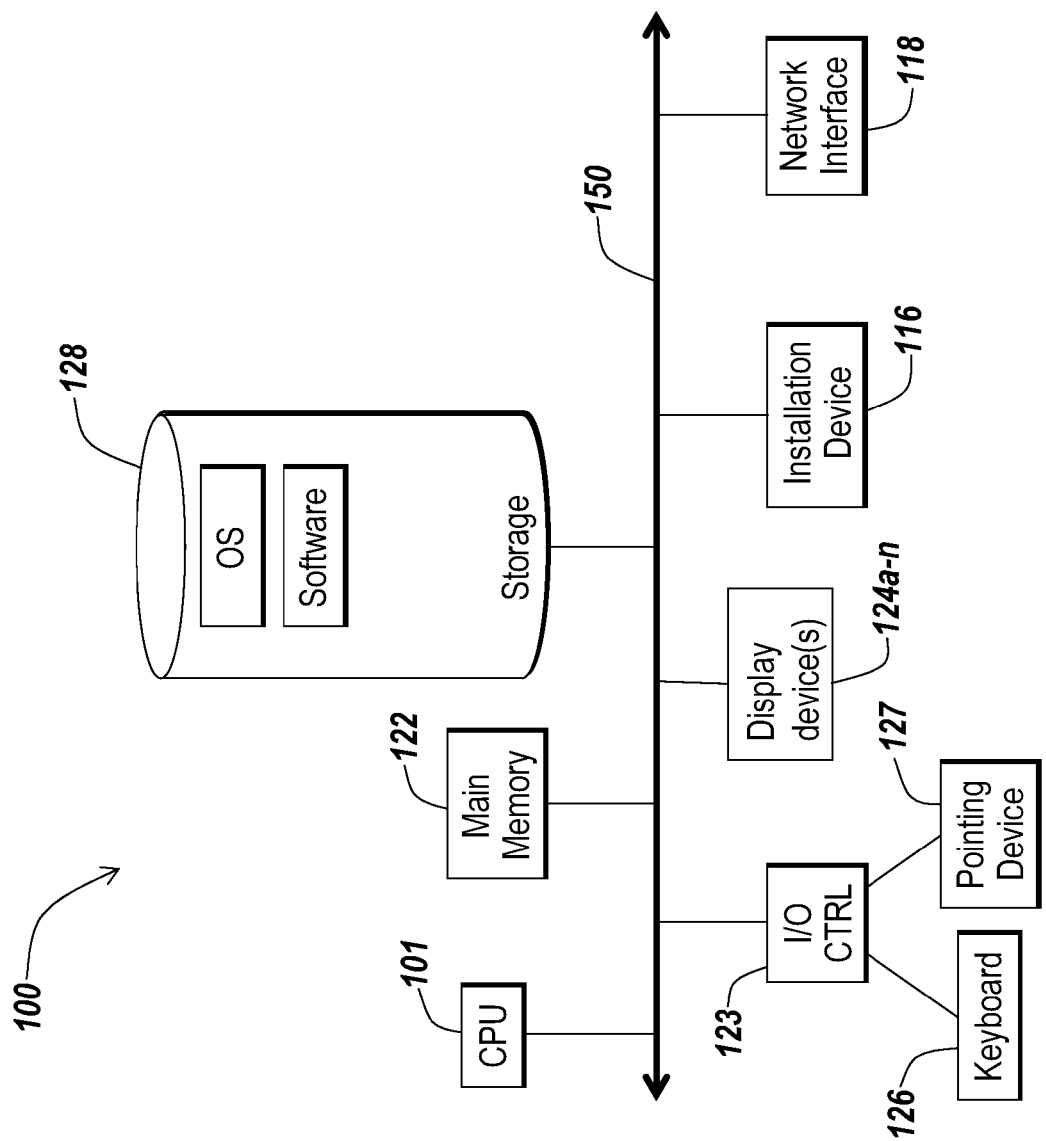
FIGS. 1C and 1D depict block diagrams of a computing device 100 which may be useful for practicing an embodiment of an OMS, ETM, or OMS interface system.
Figure 1D:
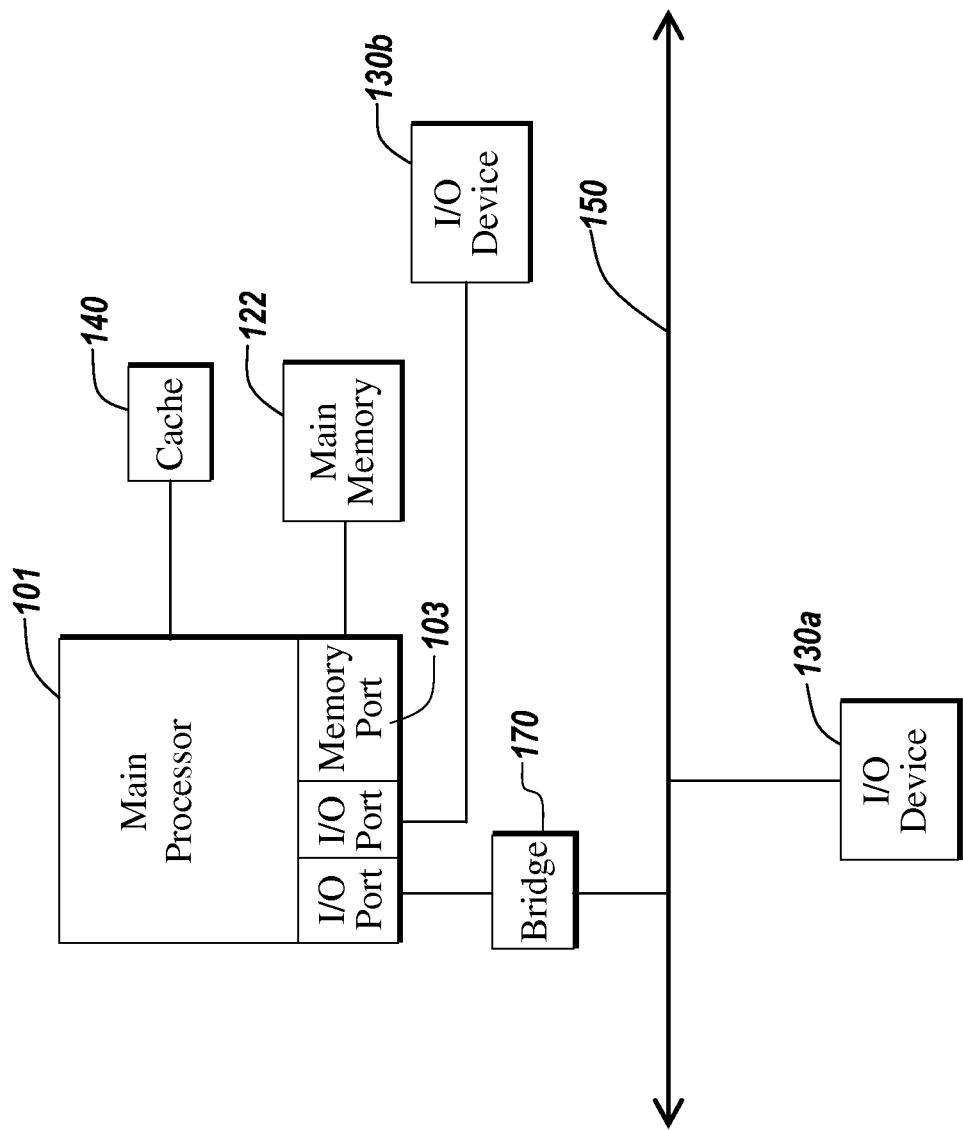

FIGS. 1C and 1D depict block diagrams of a computing device 100 which may be useful for practicing an embodiment of an OMS 110, ETM 180 or OMS interface system 190. An OMS 110, ETM 180 and OMS interface system 190 may be deployed as and/or executed on any type and form of computing device, such as a computer, network device, server, database, or appliance capable of communicating on any type and form of network and performing the operations described herein. In some embodiments, an OMS 110, ETM 180 or OMS interface system may comprise a plurality of computing devices 100. For example, an OMS 110 may comprise a database, a server, and a number of desktop computers.

As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® or OS X for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS 2003, WINDOWS XP, and WINDOWS VISTA all of which are manufactured by Microsoft Corporation of Redmond, Wash.; MacOS and OS X, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, (such as those versions of Unix referred to as Solaris/Sparc, Solaris/x86, AIX IBM, HP UX, and SGI (Silicon Graphics)), among others. In other embodiments, the computing device 100 may have different processors, operating systems, and input devices consistent with the device. Moreover, the computing device 100 can be any workstation, database, desktop computer, laptop or notebook computer, server, handheld computer, mobile telephone, smart phone, any other computer, or other form of computing or telecommunications device that is capable of communication and that has sufficient processor power and memory capacity to perform the operations described herein.

Figure 2:
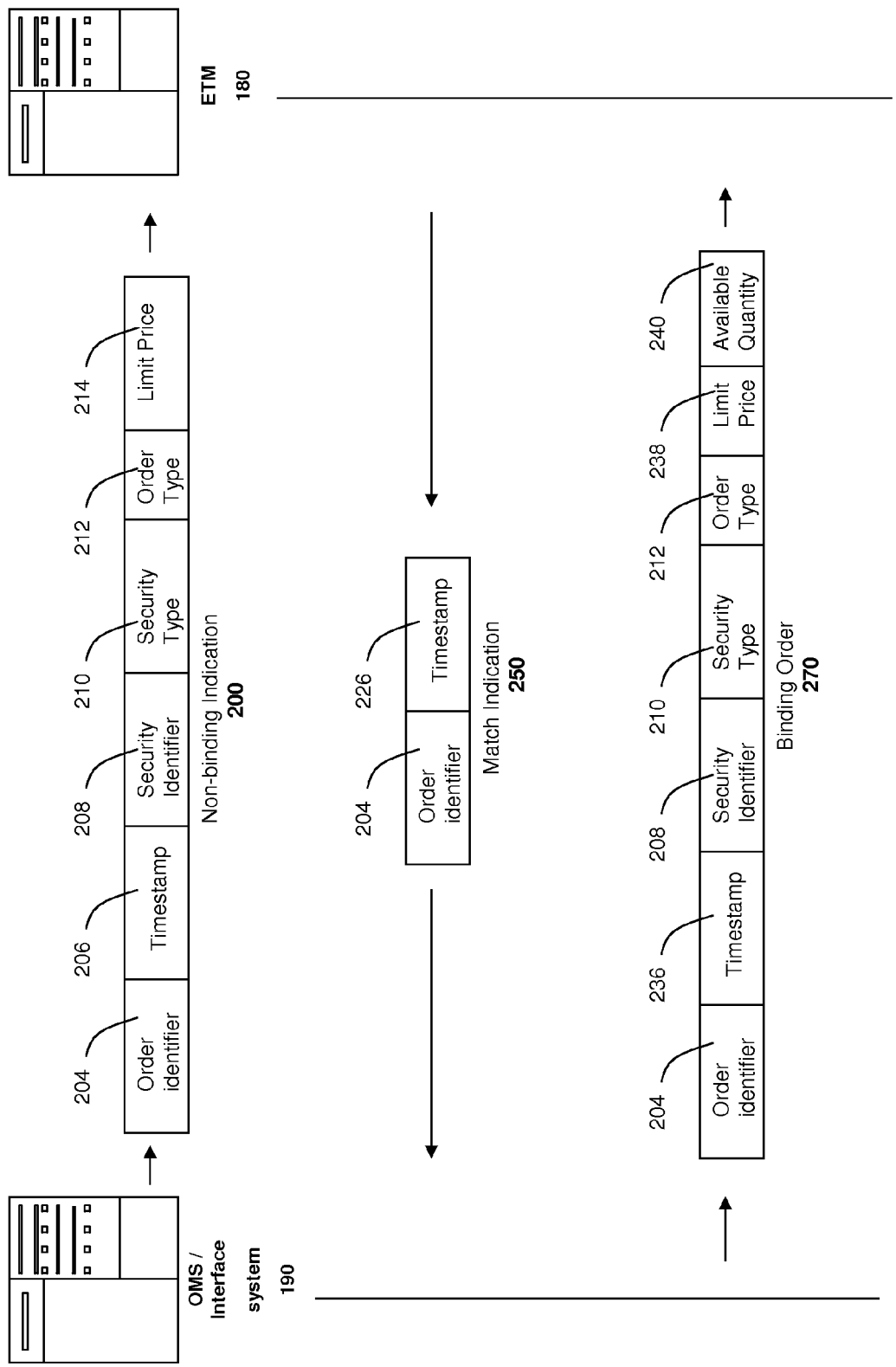
FIG. 2 is a block diagram of one embodiment of a method for using an OMS/ETM interface to facilitate securities transactions.

Now referring to FIG. 2, one embodiment of a method for using an OMS/ETM interface to facilitate securities transactions is shown. In brief overview, an OMS interface system 190 sends a non-binding indication 200 to an ETM. The nonbinding indication specifies an interest in a particular security. The ETM then transmits a match indication 250, containing information about a potential trade to be executed with respect to the non-binding indication 200. The OMS interface system may then transmit a binding order to the ETM, which commits to executing the specified security transaction.

Still referring to FIG. 2, an OMS interface system 190 transmits a non-binding indication 200 to an ETM. Although in this figure an OMS interface system 190 is shown, in other embodiments OMS/ETM interface software 105 residing on either an OMS interface system 190 or an OMS 110 may transmit the non-binding indication 200.

The OMS interface system 190 (or interface system 190) may transmit a non-binding indication to an ETM in response to querying, polling, or otherwise receiving information about an order existing in an OMS 110. For example, the interface system 190 may identify an outstanding order in an OMS 110 to purchase a given stock. The interface system 190 may then transmit a non-binding indication 200 to purchase the stock.

In one embodiment, the interface system 190 may generate and transmit non-binding indications 200 for each of all the outstanding orders exceeding a minimum available quantity in one or more OMSes 110. Available quantity may refer to the quantity which is currently uncommitted to other institutions. For example, if 200,000 shares of an outstanding order for buying 400,000 shares have already been purchased, the total available quantity for the order may be 200,000 shares. Or, if a binding order has already been placed with respect to 300,000 shares of a 400,000 share sell order, the total available quantity for the order may be 100,000 shares. The minimum available quantity may be a fixed number of available shares or instruments, or a total available dollar value for the order. For example, the interface system 190 may generate a non-binding indication 200 for every outstanding order in excess of 10 available shares. A minimum share amount may comprise any amount, including without limitation 0, 1, 100, 1000, 10,000, 100,000, or 1,000,000 shares. Or for example, the interface system may generate a non-binding indication 200 for every outstanding order with a current market value in excess of $10,000. In these embodiments, the interface system 190 may then not transmit the actual available quantity of the orders to the ETM via non-binding indications, since the minimum available quantity can be assumed.

A non-binding indication 200 may be used by the interface system 190 and the ETM to search for potential matching contra interests without the trader or OMS committing resources towards executing trades. A non-binding indication may comprise any information which allows the ETM to successfully match the non-binding indication with contra interests for potential trades. In the embodiment shown, a non-binding indication 200 comprises an order identifier 204, a timestamp 206, a security identifier 208, a security type 210, an order type 212, and a limit price 214.

An order identifier 204 comprises information identifying the order corresponding to the non-binding indication 200. For example, the order identifier may be a serial number of the order from the OMS corresponding to the non-binding indication. The order identifier may be used to notify the OMS of any potential trades with respect to the order. For example, a given order for buying 200 shares of XYZ stock may be assigned a serial number of 2412431 in an OMS system. The interface system 190 may then use the serial number 2412431 as the order identifier 204. Or alternatively, the interface system may generate unique order identifier 204 corresponding to the order having serial number 2412431 and maintain a table mapping serial numbers to order numbers. In this way, when the interface system receives a notification from the ETM relating to a given non-binding indication 200 the interface system can identify the appropriate order to take action with respect to.

A non-binding indication 200 may also comprise a timestamp 206. In one embodiment, the timestamp may identify the time at which the non-binding indication was generated. In other embodiments, the timestamp may identify the time the outstanding order was last confirmed with the relevant OMS.

A non-binding indication 200 may also comprise a security identifier 208. A security identifier 208 may comprise any information which uniquely identifies a given security. For example, a security identifier 208 may be a ticker symbol, a Committee on Uniform Securities Identification Procedures (CUSIP) number.

A non binding indication 200 may also comprise a security type 210. A security type may identify that a given security is a stock, bond, treasury bill, or other security type. The OMS/ETM interface system 190 and ETM may use the security type 210 to aid in processing other fields relating to the non-binding indication. For example, a security type may indicate whether a price field should be treated as a price-per-share (such as for stocks) or a discount from face value (such as for treasury bills).

A non-binding indication 200 may also comprise an order type 212. The order type 212 may reflect whether an order is a buy or sell order, as well as more specific types of orders, such as limit orders and market orders.

A non-binding indication 200 may also comprise a price 214. In some embodiments, the price 214 may reflect a minimum price at which an order has specified for selling. In other embodiments, a price 214 may reflect a maximum price at which an order has specified for buying.

A non-binding information may comprise any other information to aid in successfully matching interests. For example, a non-binding indication may include an expiration time after which the order is deemed to expire. Or for example, a non-binding indication may include an indication of a willingness or unwillingness to execute the order via a number of separate transactions over a given time period.

After receiving a non-binding indication, an ETM may search for a potential matching contra interest using any algorithm or method. In one embodiment, the ETM may search for matching contra interests without regard to quantity. For example, the ETM may receive some or all non-binding indications which do not indicate a quantity, such as in a system in which the interface system 190 only transmits non-binding indications for orders exceeding a given quantity. Upon identifying a potential matching contra interest, the ETM may then transmit a match indication 250. The match indication 250 may comprise any information which allows the interface system 190 to identify the nature of the potential matching interest.

In the embodiment shown, the match indication comprises the order identifier 204 from the transmitted non-binding indication. The match indication may also comprise a timestamp 226, which may identify the time at which the match indication was generated. A match indication may comprise any other information relating to the contra interest or the nature of the found match. For example, a match indication may comprise an expiration time, or a minimum or maximum quantity.

After receiving the match indication 250, the interface system 190 may then determine whether to request that the OMS generate a binding order 270 with respect to the match indication. A binding order differs from a non-binding indication in that a binding order represents a firm commitment to execute a given transaction, and may be displayed in an OMS as "placed" or "committed." In determining whether to generate a binding order the interface system 190 may check to see that the order corresponding to the non-binding indication has not already been filled. The interface system 190 may also require confirmation from an OMS. In other embodiments, the ETM may require confirmation from a user station 195.

In the embodiment shown, the binding order 270 comprises the order identifier 204, security identifier 208, security type 210 and order type 212 from the initial non-binding indication. The binding order 270 may comprise a timestamp 236 indicating the time at which the binding order was generated. The binding order 270 may also comprise a price 238 specifying the limit price for binding order. The binding order also comprises a quantity 240 for the binding order 270. In some embodiments a binding order may also comprise other information such as an expiration time, or a minimum quantity.

In some embodiments, after a binding order is generated by an OMS, the interface system 190 may require confirmation from a user station 195 before the binding order is sent to an ETM. In one embodiment, a user may have a given time limit to confirm or cancel the order and/or specify a desired trade quantity. In another embodiment, an OMS may require confirmation from a user before a binding order is sent to an ETM. In still another embodiment, an ETM may require confirmation from a user after a binding order is received and before a transaction is executed.

After receiving a binding order 270, an ETM 180 may then execute a trade including the binding order 270 and the matched contra interest. The ETM may check to see that the price, quantity, and other terms are in agreement, and no expiration time has been passed.

Figure 3:
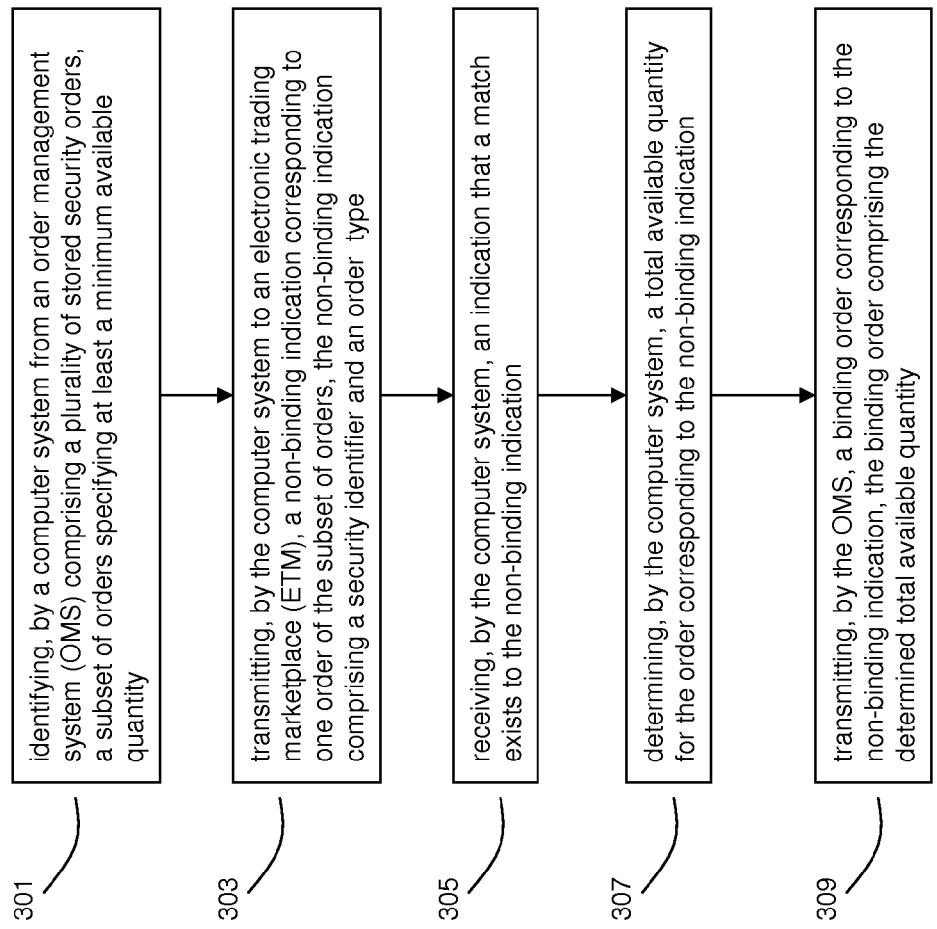
FIG. 3 is a flow diagram illustrating one embodiment of a method for facilitating securities transactions.

Referring now to FIG. 3, a flow diagram illustrating one embodiment of a method for facilitating securities transactions is shown. In brief overview, the method comprises: identifying, by a computer system from an order management system (OMS) comprising a plurality of stored security orders, a subset of orders specifying at least a minimum available quantity (step 301); transmitting, by the computer system to an electronic trading marketplace (ETM), a non-binding indication corresponding to one order of the subset of orders, the non-binding indication comprising a security identifier and the order type (step 303); receiving, by the computer system, an indication that a match exists to the non-binding indication (step 305); determining, by the computer system, a total available quantity for the order corresponding to the non-binding indication (step 307); and requesting, by the computer system from the OMS, a binding order corresponding to the non-binding indication, the binding order comprising the determined total available quantity (step 309). In some embodiments, the computer system performing the method may comprise an OMS/ETM interface system 190. In other embodiments, the computer system may comprise OMS/ETM interface software 105 executing on an OMS 110.

Still referring to FIG. 3, now in greater detail, the method shown comprises identifying, by a computer system from an order management system (OMS) 110 comprising a plurality of stored security orders, a subset of orders specifying at least a minimum available quantity (step 301). The minimum available quantity may be any quantity, and may be specified in terms of any units, including without limitation total order cost or proceeds and number of shares. Examples of minimum available quantities include, without limitation, 1 share, 2 shares, 5 shares, 10 shares, 100 shares, 500 shares, 1000 shares, 5000 shares, 10,000 shares, 50,000 shares, 100,000 shares, $1 expected total cost, $5 expected total cost, $10 expected total cost, $100 expected total cost, $1000 expected total cost, $10,000 expected total cost, $50,000 expected total cost, $100,000 expected total cost and $500,000 expected total cost. In other embodiments, minimum available quantities may be specified in any currency. In some embodiments, the computer system may identify orders specifying a minimum quantity from a plurality of OMSes 110. In some embodiments, different minimum available quantities may be specified for different securities.

In some embodiments, the computer system may identify orders specifying a minimum quantity and satisfying at least one other criterion. Examples of other criterion include security identifier, security type, order type, maximum quantity, minimum expiration time, and limit price. For example, a computer system may poll an OMS 110 to identify only orders relating to a given stock or bond specifying a minimum quantity. Or, for example, a computer system may query an OMS 110 to identify only sell orders that will not expire for at least one hour, and that specify a minimum quantity.

The computer system may identify the subset of orders via any technique, including without limitation database queries, HTTP requests, proprietary protocols, and synchronous or asynchronous updates received from the OMS 110. In some embodiments, an OMS or EMS may provide one or more APIs for accessing contents of the OMS or EMS. In some embodiments, the computer system may periodically poll the OMS 110 for outstanding orders specifying at least the minimum available quantity. For example, the computer system may query an OMS 110 database at regular intervals. The regular intervals may comprise any time interval, including 0.1 seconds, 0.5 seconds, 1 second, 5 seconds, 10 seconds, 1 minute, 2 minutes, 5 minutes, 10 minutes, 20 minutes, 30 minutes, or 1 hour. In some embodiments, in response to receiving a query for outstanding orders, an OMS 110 may display an input screen to a user of the OMS asking the user to authorize or deny the transmission of information relating to one or more orders to the OMS 110. For example, a trader may be logged into an OMS, and the trader may have some orders the trader plans to fill personally and does not want sent to the ETM 190. Or, for example, a trader logged into an OMS 110 may have some orders which are highly confidential and for which the trader does not want information about the order to be transmitted to an external source. In some embodiments, an OMS 110 may transmit information about outstanding orders to the computer system as the orders are input into the OMS 110. In one embodiment, as a trader is notified of a new order into the OMS 110 the trader may be prompted as to whether the trader would like the order to be submitted to the computer system for matching purposes.

In some embodiments the computer system may receive updates to orders the computer system has previously identified. For example, an OMS 110 may transmit information to the computer system about an order for 300,000 shares of ABC stock in response to a query for all outstanding orders having at least a quantity of 200,000 shares. If the available quantity of the order is then reduced below the 200,000 share threshold, such as if, for example, the order has already been partly filled, the OMS 110 may then transmit an indication to the computer system canceling the order. Or, for example, if a limit price specified in one of the outstanding orders changes, the OMS 110 may transmit an indication of a change in the limit price to the computer system.

After identifying a subset of orders specifying at least a minimum available quantity (step 301); the computer system may transmit, to an electronic trading marketplace (ETM), a non-binding indication corresponding to one order of the subset of orders, the non-binding indication comprising a security identifier and the order type (step 303). In some embodiments, the computer system may transmit to an electronic trading marketplace (ETM), a non-binding indication 200 corresponding to each order of the subset of orders. In other embodiments, the computer system may transmit to an electronic trading marketplace (ETM) 180, a non-binding indication 200 corresponding to only some of the subset of orders. For example, a given ETM 180 may specialize in a certain securities type, such as treasury bills. The computer system may thus only transmit non-binding indications 200 corresponding to treasury bill orders to that ETM 180, and may transmit non-binding indications 200 corresponding to other orders to a second ETM 180.

In another embodiment, the computer system may periodically transmit one or more non-binding indications 200 to the ETM. For example, the computer system may query a number of OMSes for outstanding orders, and transmit non-binding indications corresponding to the outstanding orders every 1 second, 10 seconds, 30 seconds, 1 minute, five minutes, ten minutes, or every hour. In other embodiments, the computer system may transmit a non-binding indication to an ETM immediately after receiving a notification of an outstanding order from an OMS.

After transmitting a non-binding indication 200, the computer system may receive an indication that a match exists to the non-binding indication 200. In some embodiments, the indication may comprise a match indication 250. In some embodiments, the computer system may receive a plurality of match indications 250 corresponding to a single non-binding indication. In other embodiments, the computer system may receive a plurality of match indications 250 corresponding to a plurality of non-binding indications 200.

After receiving an indication that a match exists to the non-binding indication (step 305), the computer system may determine a total available quantity for the order corresponding to the non-binding indication (step 307). A total available quantity comprises the total quantity for the order which is available to be filled via the ETM. For example, if, for an order to buy 40,000 shares of ABC, 30,000 shares have already been bought or placed through means other than the ETM, the total available quantity may be 10,000 shares. In some embodiments, the computer system may query the OMS from which the order originated for the total available quantity.

The computer system may also retrieve any other pertinent information from the OMS, including without limitation a minimum quantity for execution, security account/availability information, authentication information, and limit price information. For example, with respect to an order to buy 100,000 shares of ABC, the order may specify not to buy any amount of shares less than 50,000. Or for example, with respect to an order to sell short 20,000 shares of XYZ, the computer system may query the OMS to confirm availability of the 20,000 shares.

After determining a total available quantity for the order corresponding to the non-binding indication (step 307) the computer system may transmit an indication to an OMS to generate a binding order corresponding to the non-binding indication, the binding order comprising the determined total available quantity. The generated binding order 270 may comprise any other information pertinent to executing a securities transaction, including without limitation quantity, price, security type, order type, security identifier, and an expiration time. In some embodiments, after generating a binding order, the OMS may then transmit the binding order to the computer system. In other embodiments, the OMS may transmit a generated binding order directly to an ETM. In some embodiments, an OMS may transmit a binding order directly to an ETM immediately after determining a total available quantity in response to either 1) a received request for a binding order for the total available quantity or 2) a received match indication.

After receiving a binding order 270, an ETM may perform any methods to confirm that a valid matching contra interest still exists, and that a binding order 270 for the matching contra interest has also been received. For example, an ETM, upon finding matching non-binding indications, may transmit match indications 250 to the OMS/ETM interface software 105 which generated each of the non-binding indications 200. The ETM may then wait to receive binding orders for each of the non-binding indications before executing the transaction. In one embodiment, an ETM may display an input screen to a user to confirm the quantity to be executed. For example, a screen may be displayed to a trader asking, for an indication to sell shares of XYZ, how many shares should be sold. The interface screen may also prompt an OMS user to confirm that the transaction should be executed. In some embodiments, this screen may incorporate a time limit which restricts the amount of time a user has to specify a quantity and/or confirm a transaction.

An ETM 180 may use any means to execute a transaction, including any means for executing securities transactions electronically. In some embodiments, after executing a transactions, an ETM may then notify the appropriate parties that the transaction has been executed, and any outstanding binding orders and non-binding indications corresponding to the executed transaction may be modified or removed as necessary.

Figure 4A:
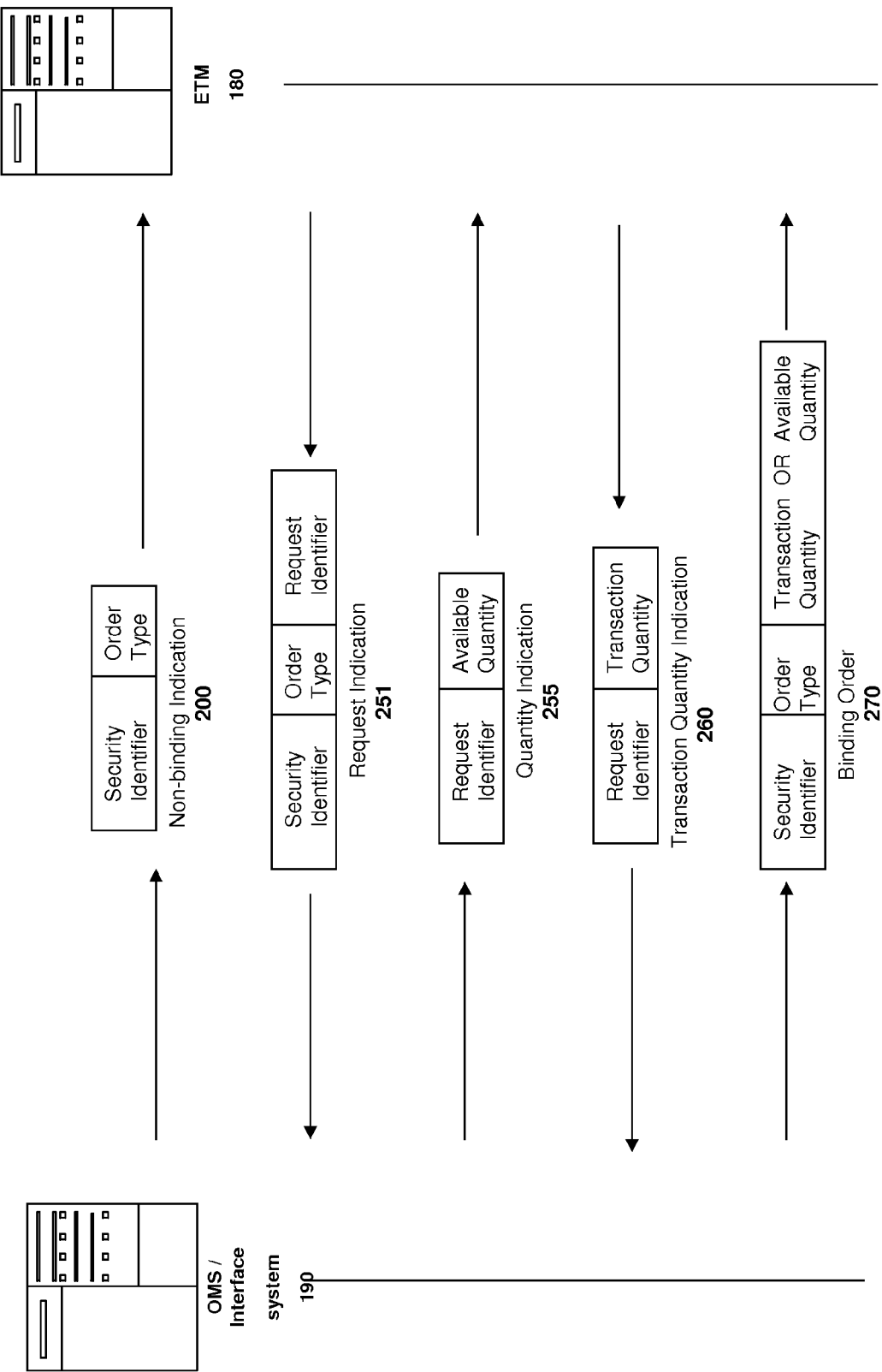
FIG. 4A is a block diagram of a second embodiment for using an OMS/ETM interface to facilitate securities transactions.

Referring now to FIG. 4A, a second embodiment of a system for facilitating securities transactions is shown. In brief overview, an OMS interface system 190 exchanges a number of messages with an ETM 180 in the process of determining a potential transaction. The OMS interface system 190 sends a non-binding indication 200 indicating a security identifier and order type. The ETM, may then transmit a request indication 250 containing a request identifier, which may be a serial number or other internal record of the ETM used to identify the request or the non-binding indication. The OMS interface system 190 may then respond with a quantity indication 255 informing the ETM of a total available quantity remaining for the requested security. The ETM may then, after identifying a matching counterparty, respond with a transaction quantity, which indicates a quantity of the potential transaction given the available quantities of the matching parties. The OMS Interface system may then request the OMS to respond with a binding order 270. This binding order may specify the received transaction quantity or a second available quantity. In some cases, the OMS may send a binding order 270 for a second, larger available quantity. This system will be discussed further in view of the method shown in FIG. 4B.

Referring now to FIG. 4B, a second embodiment of a computer implemented method for facilitating securities transactions is shown. In brief overview, the method comprises: identifying, by a computer system from an order management system (OMS) comprising a plurality of stored security orders, a subset of orders specifying at least a minimum available quantity (step 301); transmitting, by the computer system to an electronic trading marketplace (ETM), a first non-binding indication corresponding to one order of the subset of orders, the first non-binding indication comprising a security identifier and the order type (step 303); receiving, by the computer system from an ETM, a request for a quantity corresponding to the first non-binding indication (step 405); determining, by the computer system, a total available quantity corresponding to the first non-binding indication (step 307); and transmitting, by the computer system to the ETM, in response to the received indication, the determined total available quantity (step 409); determining, by the ETM, a transaction quantity for a transaction corresponding to the transmitted request indication, the first non-binding indication, and the determined total available quantity (step 411); transmitting, by the ETM to the computer system, the determined transaction quantity (step 413); and receiving, from the OMS, a binding order (step 415). In one embodiment, the binding order may specify the determined transaction quantity. In other embodiments, the binding order may specify a total available quantity.

Still referring to FIG. 4B, now in greater detail the first, second, and fourth steps of the method shown may be substantially similar to the method shown in FIG. 3, and may be performed in any manner described herein. The method shown in FIG. 4 may be used in cases where additional assurances of a minimum available quantity are required or desired before resources are committed to executing a transaction relating to the request indication. This method may also be used by an ETM to collect information which can lead to better matching of contra interests.

In the method shown, a computer system may receive a request for an available quantity corresponding to a non-binding indication in any manner (step 405). In some embodiments, an ETM may transmit a request for an available quantity corresponding to a non-binding indication at regular intervals. For example, an ETM may periodically request an available quantity for non-binding indications received. In one embodiment, an ETM may transmit a single request which requests available quantities for a plurality of non-binding indications. For example, an ETM may transmit a request to the computer system every thirty seconds for the available quantities of all of the received transactions. In other embodiments, other time intervals may be used including, without limitation, 1, 2, 5, 10, 15 20, 25, 30, 45, and 60 seconds. In one embodiment, an ETM may transmit a request asking the computer system for available quantities of only those non-binding indications which have had a change in available quantity since a previous transmission.

The computer system transmits the determined total available quantity to the ETM in any manner (step 409). The computer system may transmit the determined total available quantity in any format, and may include any other pertinent information, such as an order identifier, a request identifier, timestamp, expiration time, and minimum executable quantity. The computer system may determine the available quantity in any manner. In some embodiments, the computer system may request an updated available quantity from an OMS. In other embodiments, the computer system may periodically poll an OMS to obtain updated available quantities for a number of non-binding indications. In these embodiments, the computer system may maintain a list or other database containing updated available quantities for each of a plurality of transmitted non-binding indications.

In some embodiments, an OMS may transmit indications to the computer system each time an available quantity for a non-binding indication changes. In one of these embodiments, the computer system may immediately transmit an indication to the ETM of an updated quantity upon receiving it from the OMS. In other embodiments, the computer system may store the updated quantity until receiving a request from the ETM.

After receiving the total available quantity, the ETM may then determine a transaction quantity corresponding to the non-binding indication and the total available quantity (step 411). The transaction quantity may be determined in any manner. In one embodiment, the ETM may identify a matching counterparty, and determine a transaction quantity comprising the maximum amount possible to be traded between the parties given their available quantities. For example, if the ETM found a match between two non-binding indications— one buying and one selling shares of XYZ—the ETM may then receive total available quantities corresponding to each of the non-binding indications. If the quantities are 500,000 shares for the buy order, and 300,000 shares for the sell order, the transaction quantity may then be 300,000 shares.

After determining a transaction quantity (step 411), the ETM may then transmit, to the computer system, the determined transaction quantity (step 413). The ETM may transmit the transaction quantity along with a request identifier or other information allowing the computer system to identify the non-binding indication which the transaction quantity corresponds to. In one embodiment, upon receiving the transaction quantity indication, the computer system may then confirm with the OMS that the determined transaction quantity is still valid. If the OMS confirms, the OMS may then generate and transmit a binding order to the ETM for the determined transaction quantity or a total available quantity.

In some embodiments, any of the above methods and systems may be used in conjunction with a "follow-on" mode. In follow-on mode, after a match is found and an initial trade completed, an opportunity may be given by a computer system or ETM to a trader or OMS to do an additional trade with the counterparty from the first trade. This may allow a trader to utilize an opportunity presented by finding a qualified and anonymous counterparty. In one embodiment, after a trade is executed, each trader may have a time period within which to check market conditions and determine the amount of his or her follow on trade. A user interface may be displayed in any manner for receiving trader input with respect to a follow-on transaction, including without limitation on a user station 195 connected to an ETM, OMS or EMS for that purpose.

For example, after a trade is completed, a user at a user station 195 may be presented with a dialog box prompting the user to enter an additional quantity to trade. In some embodiments, this dialog box may have a set time limit before it expires. The time limit may comprise any duration including, without limitation, 10 seconds, 30 seconds, 60 seconds, 2 minutes, and 5 minutes. Such a screen may be displayed in user/ETM interface software 199, or may be displayed from within an OMS. In another embodiment, follow-on mode may be set in advance. In this embodiment, a trader may designate certain orders to apply "follow-on" to as the orders are being input into the OMS or via a user station 195. An OMS may also be configured to automatically transfer shares previously committed to other trading venues to the follow-on transaction in the event a first trade is executed. In any of these follow-on embodiments, an execution management system (EMS) may be used to facilitate the transfer of any shares between trading venues.

In other embodiments, any of the above systems and methods may be combined with additional systems and methods to prevent, minimize, or penalize leakage of information related to request indications, non-binding indications, or binding orders. For example, in systems where user confirmation is required before a binding order is sent to an ETM, a user may know when the confirmation screen is displayed that a contra interest to the user's position exists in a certain quantity. If the user then cancels the transaction, a user may have gained information about outstanding orders in a market without having to execute a trade. In some embodiments, this potential for information leakage may be deterred by assigning a credit rating to each user. This credit rating may be decremented each time a user fails to confirm a trade, and thus be indicative of the reliability of any non-binding indications placed by the user.

In some embodiments, credit ratings may also be assigned to groups or institutions. In embodiments where credit ratings are used, users may be able to specify that they are only interested in trading with other users or institutions above a given credit rating. A contra-party credit rating may be specified by security, group of securities meeting a criteria, security type, or other filter. For example, a trader may desire a higher minimum credit rating for trading securities which have lower levels of liquidity and which may be more subject to market manipulations. In other embodiments, an entity operating an ETM may choose to suspend, deactivate, or otherwise penalize an account with a credit rating below a given threshold.

In some embodiments, an ETM or ETM interface may similarly monitor cancellation rates with respect to request indications that do not require user confirmation. For example, a credit rating may be decremented in cases in which a request indication is sent to an OMS and the OMS then indicates that it no longer has a previously indicated quantity to be executed.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A computer implemented method for facilitating securities transactions, the method comprising:
   (a) identifying, by a computer system from an order management system (OMS) comprising a plurality of stored security orders, a subset of orders specifying at least a minimum available quantity;
   (b) transmitting, by the computer system to an electronic trading marketplace (ETM), order information corresponding to one order of the subset of orders, the order information consisting of a security identifier and the order type;
   (c) receiving, by the computer system from the ETM, a request for an available quantity of the security identified by the order information;
   (d) transmitting, by the computer system to the OMS, a request for a total available quantity for the security identified by the order information; and (e) receiving from the OMS, a binding order corresponding to the order information, the binding order identifying a determined total available quantity of the security.

2. The method of claim 1, wherein step (a) comprises identifying, by a computer system from an order management system (OMS) comprising a plurality of stored security orders, a subset of orders specifying at least a minimum available quantity and meeting at least one other criterion.

3. The method of claim 1, wherein step (a) comprises periodically identifying, by a computer system for an order management system (OMS) comprising a plurality of stored security orders, a subset of orders specifying at least a minimum available quantity.

4. The method of claim 1, wherein step (b) comprises periodically transmitting, by the computer system to an electronic trading marketplace (ETM), order information corresponding to one of the subset of orders, the order information consisting of a security identifier and the order type.

5. The method of claim 1, further comprising:
displaying, to a user, a decision screen with respect to a potential transaction corresponding to the binding order; and
transmitting, to an ETM, the binding order in response to a user decision.

6. The method of claim 1, wherein step (e) comprises receiving from the OMS, a binding order, the binding order comprising the determined total available quantity, the security identifier and an order type identified by the order information.

7. The method of claim 1, wherein step (e) comprises receiving from the OMS a binding order, the binding order comprising the determined total available quantity, a minimum executable threshold, the security identifier and an order type identified by the order information.

8. The method of claim 1, further comprising the step of presenting, to a user after the execution of a transaction of a security, a decision screen which receives a commitment to trade an additional quantity of the security with a counterparty from the transaction.

9. The method of claim 1, further comprising the step of transmitting, after an execution of a transaction of a security, an indication of an opportunity to trade an additional quantity of the security with a counterparty from the transaction.

10. A computer-implemented system for facilitating securities transactions, the system compromising:
an order information collector executing on a computing device, the order information collector identifies, from at least one order management system (OMS) compromising a plurality of stored security orders, a subset of orders specifying at least a minimum available quantity;
an electronic trading marketplace (ETM) interface in communication with the order information collector which transmits, to an ETM, order information corresponding to one order of the subset of orders, the order information consisting of a security identifier and the order type; and receives from the ETM an indication that a match exists to the transmitted order information; and
wherein the order information collector transmits the match indication to the OMS and receives in response a binding order corresponding to the order information, the binding order comprising the determined total available quantity.

11. The system of claim 10, wherein one of the order information collector and ETM interface comprises a computer program executing on at least one computer.

12. The system of claim 10, wherein the order information collector identifies, from an order management system (OMS) comprising a plurality of stored security orders, a subset of orders specifying at least a minimum available quantity and meeting at least one other criterion.

13. The system of claim 10, wherein the order information collector periodically identifies, from an order management system (OMS) comprising a plurality of stored security orders, a subset of orders specifying at least a minimum available quantity.

14. The system of claim 10, wherein the ETM interface periodically transmits, to an electronic trading marketplace (ETM), order information corresponding to one of the subset of orders, the order information comprising a security identifier and the order type.

15. The system of claim 10, wherein the ETM interface receives a plurality of indications, each indication indicating that a match exists to the transmitted information.

16. The system of claim 10, further comprising a user station which displays, to a user, a decision screen with respect to a potential transaction corresponding to the binding order; and transmits a received user decision.

17. The system of claim 10, wherein the order information collector received from the OMS a binding order, the binding order comprising the determined total available quantity and the security identifier and order type identified by the order information.

18. The system of claim 10, wherein the order information collector received from the OMS a binding order, the binding order comprising the determined total available quantity, a minimum executable threshold, and the security identifier and order type identified by the order information.

19. The system of claim 10, further comprising a decision screen, in communication with the ETM interface, which receives from a user, after the execution of a transaction of a security, a commitment to trade an additional quantity of the security with a counterparty from the transaction.

* * * * *

UNITED STATES PATENT AND TRADEMARK OFFICE
CERTIFICATE OF CORRECTION

| | | |
|---|---|---|
| PATENT NO. | : 8,521,627 B2 | Page 1 of 1 |
| APPLICATION NO. | : 11/736962 | |
| DATED | : August 27, 2013 | |
| INVENTOR(S) | : Ford et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1545 days.

Signed and Sealed this
Twenty-seventh Day of January, 2015

Michelle K. Lee
*Deputy Director of the United States Patent and Trademark Office*